United States Patent Office 3,595,916
Patented July 27, 1971

3,595,916
NOVEL DIAMINO COMPOUNDS
Walter Ost, Klaus Thomas, and Dietrich Jerchel, Ingelheim am Rhein, and Karl-Richard Appel, Biberach an der Riss, Germany, assignors to C. H. Boehringer Sohn, Ingelheim am Rhein, Germany
No Drawing. Filed Jan. 22, 1969, Ser. No. 793,187
Claims priority, application Austria, Jan. 23, 1968, A 674/68; May 17, 1968, A 4,795/68
Int. Cl. A01n 5/00
U.S. Cl. 260—561          6 Claims

ABSTRACT OF THE DISCLOSURE

The compounds are biocidal diamino compounds of the formula

R—CO—NH—CH—CCl$_3$
|
Q
|
R—CO—NH—CH—CCl$_3$ wherein
R is hydrogen or lower alkyl which may have one or more halogen atoms attached thereto, and
Q is

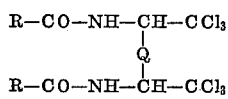
or
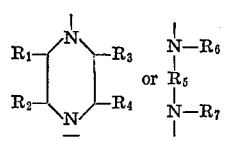

where
R$_1$ is hydrogen, lower alkyl or phenyl,
R$_2$, R$_3$ and R$_4$ are each hydrogen or lower alkyl,
R$_5$ is alkylene of 1 to 10 carbon atoms, and
R$_6$ and R$_7$ are each hydrogen, alkyl of 1 to 16 carbon atoms, allyl, β-cyanoethyl, phenyl or benzyl, which may have one or two halogen substituents attached thereto.

---

This invention relates to novel diamino compounds, as well as to a method of preparing the same.

More particularly, the present invention relates to a novel class of diamino compounds of the formula

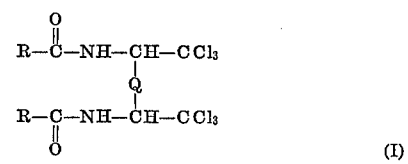

wherein
R is hydrogen or straight or branched lower alkyl which may have one or more halogen substituents attached thereto, and
Q is

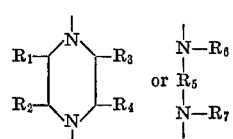

where

R$_1$ is hydrogen, lower alkyl or phenyl.
R$_2$, R$_3$ and R$_4$ are each hydrogen or lower alkyl,
R$_5$ is straight or branched alkylene of 1 to 10 carbon atoms, and
R$_6$ and R$_7$ are each hydrogen, alkyl of 1 to 16 carbon atoms, allyl, β-cyanoethyl, phenyl or benzyl, which may have one or two, identical or different, halogen substituents attached thereto.

A compound of the Formula I may be prepared by methods involving well known chemical principles, among which the following have proved to be particularly convenient and efficient:

METHOD A

By reacting a compound of the formula

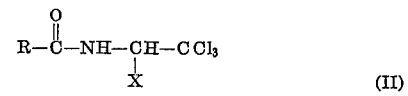

wherein R has the same meanings as in Formula I and X is a substitutent which may easily be split off in the form of an anion, such as chlorine, bromine, arylsulfonyloxy, alkylsulfonyloxy, aryloxy, trifluoroacetoxy or arylcarbonyloxy, with a compound of the formula

H—Q—H          (III)

wherein Q has the same meanings as in Formula I, pursuant to the following reaction formula

(II)          (III)

The reaction is preferably carried out in the presence of an inert organic solvent, such as tetrahydrofuran, dioxane, toluene, acetone or a chlorinated hydrocarbon, at a temperature between about —20 and +100° C., preferably between +20 and +40° C.

When X in Formula II is chlorine or bromine it is advantageous to add to the reaction mixture an equivalent amount of a tertiary amine, such as triethylamine. In those instances it is assumed that a reactive intermediate of the formula R—CO—N=CH—CCl$_3$ is formed, which then reacts further to undergo an addition reaction with the diamine H—Q—H and forms a compound of the Formula I.

METHOD B

For the preparation of a compound of the Formula 1 wherein Q is —NR$_6$—CH$_2$—NR$_6$—, i.e. where R$_6$ and R$_7$ are identical substituents and R$_5$ is methylene, by subjecting a compound of the formula

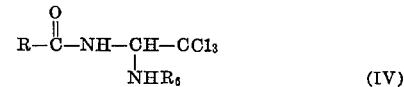

wherein R and R$_6$ have the same meanings as in Formula I, to a condensation reaction with formaldehyde at room temperature, for example, and in the presence of an aqueous or organic solvent.

The end products of the Formula I obtained in Methods A and B are weak bases; some of them are colorless crystalline solids which are sparsely soluble in water, while the others are oily or glassy-amorphous substances which may be purified by way of their hydrohalic acid addition salts. However, all of the bases are relatively easily soluble in dimethylsulfoxide, tetrahydrofuran, cyclohexanone, dimethylformamide, N-methyl-pyrrolidone and butyrolactone.

The starting compounds of the Formula II may be prepared pursuant to known processes, such as by exchange of the hydroxyl group in a compound of the formula R—CO—NH—CHOH—CCl$_3$ for a substitutent X, as defined in connection with Formula II above.

The following examples further illustrate the present invention and will enable others skilled in the art to understand it more completely. It should be understood, how-

Example 1

Preparation of N,N'-bis-[(1-acetamido-2,2,2-trichloro)-ethyl]-piperazine by method A.—While stirring, a solution of 3.44 gm. (0.04 mol) of piperazine and 8.2 gm. (0.081 mol) of triethylamine in 60 cc. of peroxide-free tetrahydrofuran was added dropwise to a solution of 18.0 gm. (0.08 mol) of N-(1,2,2,2-tetrachloro-ethyl)-acetamide in 50 cc. of peroxide-free tetrahydrofuran. Thereafter, the reaction mixture was allowed to stand for one hour at room temperature, then vacuum-filtered, the filter cake of triethylamine hydrochloride was washed with tetrahydrofuran, and the filtrate was evaporated in vacuo. The semi-solid residue was digested with ether, and the crystalline product formed thereby was separated by vacuum filtration and washed with ether, yielding 15.1 gm. (81% of theory) of a colorless substance which was recrystallized from isopropanol. The product was identified to be N,N'-bis-[(1-acetamido-2,2,2-trichloro)-ethyl]-piperazine, decomposition point about 180° C. (depending upon the rate of heating), of the formula

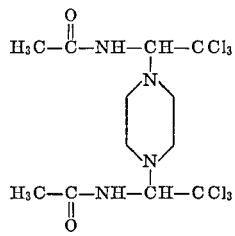

*Analysis.*—Calculated (percent): C, 31.13; H, 3.92; N, 12.10. Found (percent): C, 31.07; H, 4.13; N, 11.94.

Example 2

Using a procedure analogous to that described in Example 1, N,N'-bis-[1-dichloroacetamido-2,2,2-trichloro)-ethyl]-piperazine, decomposition point about 180° C., of the formula

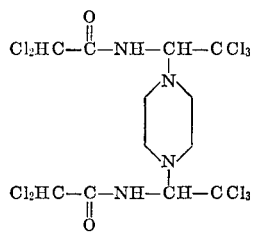

was prepared from N-(1,2,2,2-tetrachloro-ethyl)-dichloroacetamide and piperazine. The yield was 94% of theory.

*Analysis.*—Calculated (percent): C, 23.99; H, 2.35; Cl, 59.01; N, 9.33. Found (percent): C, 24.16; H, 2.33; Cl, 58.5; N, 9.03.

Example 3

Using a procedure analogous to that described in Example 1, N,N'-bis[(1-trichloroacetamido-2,2,2-trichloro)-ethyl]-piperazine, decomposition point about 180° C., of the formula

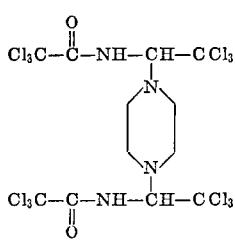

was prepared from N-(1,2,2,2-tetrachloroethyl)-trichloroacetamide and piperazine. The yield was 45% of theory.

*Analysis.*—Calculated (percent): C, 21.52; H, 1.81; N, 8.36. Found (percent): C, 21.40; H, 1.95; N, 8.31.

Example 4

Using a procedure analogous to that described in Example 1, N,N'-bis-[(1-formamido-2,2,2-trichloro)-ethyl]-2-methyl-piperazine, decomposition point about 167° C., of the formula

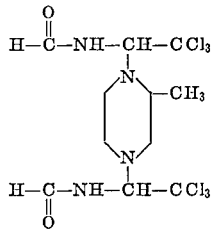

was prepared from N-(1,2,2,2-tetrachloro-ethyl)-formamide and 2-methyl-piperazine. The glassy-amorphous residue remaining after evaporation of the tetrahydrofuran solution was dissolved in methylene chloride while gently heating, and after a few minutes of standing the reaction product crystallized out of the solution in the form of colorless crystals. The yield was 79% of theory.

Example 5

Using a procedure analogous to that described in Example 1, N,N'-bis-[(1-trimethylacetamido-2,2,2-trichloro)-ethyl]-piperazine, decomposition point about 200° C., of the formula

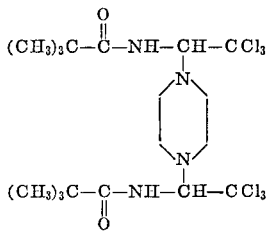

was prepared from N-(1,2,2,2-tetrachloro-ethyl)-pivalic acid amide and piperazine. The product partially precipitated from the tetrahydrofuran solution togther with the triethylamine hydrochloride; a second fraction was obtained by evaporating the mother liquor in vacuo. The total yield was 85% of theory.

*Analysis.*—Calculated (percent): C, 39.51; H, 5.53; N, 10.24. Found (percent): C, 39.79; H, 5.72; N, 10.26.

Example 6

Using a procedure analogous to that described in Example 1, N,N'-bis-[(1-chloroacetamido - 2,2,2-trichloro)-ethyl]-piperazine, decomposition point about 173° C., of the formula

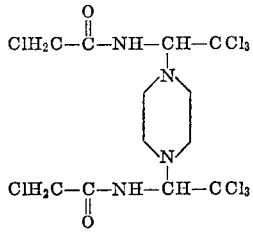

was prepared from N-(1,2,2,2-tetrachloroethyl)-chloroacetamide and piperazine. The yield was 86% of theory.

*Analysis.*—Calculated (percent): C, 27.08; H, 3.03; N, 10.53. Found (percent): C, 27.22; H, 2.86; N, 10.20.

Example 7

Preparation of N,N'-bis-[(1-formamido-2,2,2-trichloro) ethyl]-piperazine by method A.—While stirring, a solution of 4.3 gm. (0.05 mol) of piperazine and 10.5 gm. (0.104 mol) of triethylamine in 70 cc. of acetone was added dropwise to a solution of 21.1 km. (0.1 mol) of (1,2,2,2-tetrachloro-ethyl)-formamide in 30 cc. of acetone. Thereafter, the reaction mixture was allowed to stand at room temperature, and then the precipitate consisting of the reaction product and triethylamine hydrochloride was separated by vacuum filtration, thoroughly washed first with water and then with cold methanol and finally dried at 40° C., yielding a colorless crystalline powder having a decomposition point of about 175° C. (depending upon the rate of heating), which was identified to be N,N'-bis-[(1-formamido-2,2,2-trichloro)-ethyl]-piperazine.

A second fraction of this compound was obtained by evaporation of the acetonic mother liquor and washing of the residue with cold methanol. The total yield was 18.7 gm. (86% of theory). The product was recrystallizable from dioxane.

*Analysis.*—Calculated (percent): C, 27.61, H, 3.24; N, 12.88. Found (percent): C, 27.90; H, 3.38; N, 12.68.

Example 8

N,N' - bis - [(1 - formamido-2,2,2-trichloro)-ethyl]-piperazine.—21.1 gm. (0.1 mol) of powdered N-(1,2,2,2-tetrachloro-ethyl)-formamide were suspended in 50 cc. of water and, while stirring, a mixture of 4.3 gm. (0.05 mol) of piperazine, 10.1 gm. (0.1 mol) of triethylamine and 50 cc. of water was added dropwise to the suspension at 20–25° C. Thereafter, the reaction mixture was stirred for 30 minutes more at room temperature, the aqueous phase was decanted, and the tacky crystalline residue was digested with 30 cc. of methanol, vacuum filtered, and washed with methanol. 50% of theory of N,N'-bis-[(1-formamido - 2,2,2 - trichloro)-ethyl]-piperazine was obtained.

Example 9

N,N - bis - [(1 - formamido-2,2,2-trichloro)-ethyl]-piperazine.—5.3 gm. (0.05 mol) of sodium carbonate were added to a solution of 21.1 gm. (0.1 mol) of N-(1,2,2,2-tetrachloro-ethyl)-formamide in 50 cc. of acetone, and then, while stirring, a solution of 4.3 gm. (0.05 mol) of piperazine in 50 cc. of acetone was added dropwise. Thereafter, the reaction mixture was stirred for thirty minutes more, the acetone was distilled off in vacuo, and the residue was washed first with water and then with cold methanol and finally dried. The yield was 77% of theory of N,N' - bis - [(1-formamido - 2,2,2 - trichloro)-ethyl]-piperazine.

Example 10

Using a procedure analogous to that described in Example 1, N,N'-bis[(1-propionamido-2,2,2-trichloro)-ethyl]-piperazine, decomposition point 184–185° C., of the formula

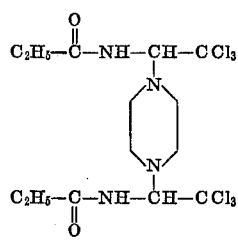

was prepared from N-[1,2,2,2-trichloro)-ethyl]-propionamide and piperazine. The yield was 44% of theory.

Example 11

Using a procedure analogous to that described in Example 1, N,N' - bis-[(1-propionamido-2,2,2-trichloro)-ethyl]-2-methyl-piperazine, decomposition point 165–167° C., of the formula

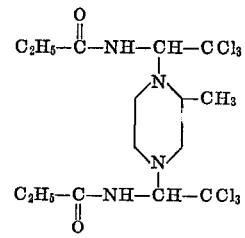

was prepared from N-[1,2,2,2-tetrachloro)-ethyl]propionamide and 2-methyl-piperazine. The yield was 66% of theory.

Example 12

Using a procedure analogous to that described in Example 1, N,N'-bis-[(1 - fluoroacetamido-2,2,2-trichloro)-ethyl]-piperazine, decomposition point 163–168° C., of the formula

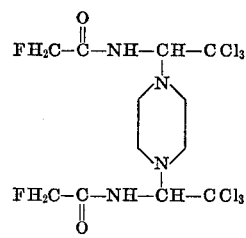

was prepared from N - [(1,2,2,2 - tetrachloro) - ethyl]-fluoroacetamide and piperazine. The yield was 64% of theory.

Example 13

Using a procedure analogous to that described in Example 1, N,N'-bis-[(1-fluoroacetamido-2,2,2-trichloro)-ethyl]-2-methyl-piperazine, decomposition point 138–142° C., of the formula

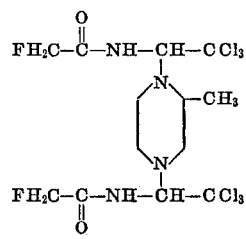

was prepared from N-[1,2,2,2-tetrachloro)-ethyl]-fluoroacetamide and 2-methyl-piperazine. The yield was 29% of theory.

Example 14

Using a procedure analogous to that described in Example 1, N,N'-bis[(1-trichloroacetamido-2,2,2-trichloro)-ethyl]-2-methyl-piperazine, decomposition point 130–135° C., of the formula

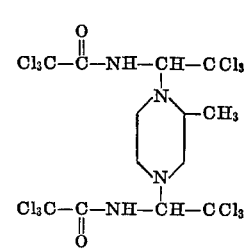

was prepared from N-[(1,2,2,2 - tetrachloro)-ethyl]-trichloroacetamide and 2-methyl-piperazine. The yield was 50% of theory.

Example 15

Using a procedure analogous to that described in Example 1, N,N'-bis[(1 - trifluoroacetamido - 2,2,2 - trichloro)-ethyl]-piperazine, decomposition point 155–158° C., of the formula

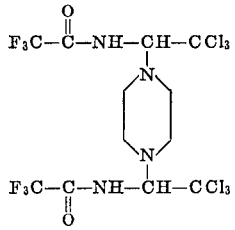

was prepared from N-[(1,2,2,2 - tetrachloro)-ethyl]-trifluoroacetamido and piperazine. The yield was 76% of theory.

Example 16

Using a procedure analogous to that described in Example 1, N,N'-bis-[(1 - formamido - 2,2,2 - trichloro)-ethyl] - 2,5 - dimethyl-piperazine, decomposition point 184° C., of the formula

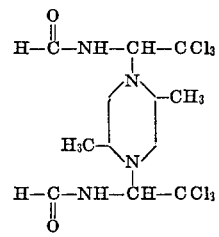

was prepared from N-[(1,2,2,2-tetrachloro)-ethyl]-formamide and a mixture of cis- and trans-isomers of 2,5-dimethyl-piperazine. The yield was 28% of theory.

Example 17

Using a procedure analogous to that described in Example 1, N,N'-bis-[(1 - formamido - 2,2,2 - trichloro)-ethyl] - 2,3,5,6 - tetramethyl-piperazine, decomposition point 180° C., of the formula

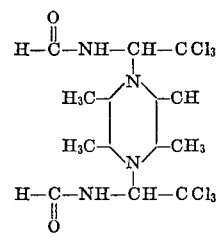

was prepared from N-[(1,2,2,2 - tetrachloro)-ethyl]-formamide and a stereoisomeric mixture of 2,3,5,6-tetramethyl-piperazine. The yield was 45% of theory.

Example 18

Using a procedure analogous to that described in Example 1, N,N'-bis-[(1 - formamido - 2,2,2 - trichloro)-ethyl] - 2,3 - trans-dimethyl-piperazine, decomposition point 182° C., of the formula

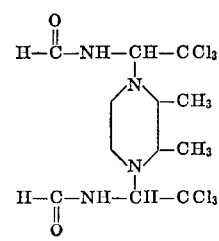

was prepared from N-[(1,2,2,2 - tetrachloro)-ethyl]-formamide and trans - 2,3 - dimethyl-piperazine. The yield was 17% of theory.

Example 19

Using a procedure analogous to that described in Example 1, N,N'-bis-[(1 - formamido - 2,2,2 - trichloro)-ethyl]-trans - 2 - methyl - 3 - ethyl-piperazine, decomposition point 172° C., of the formula

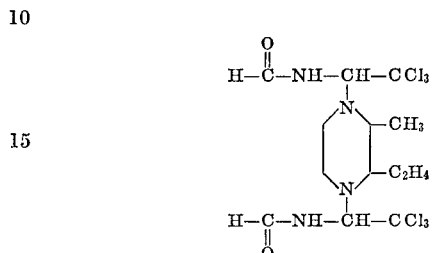

was prepared from N-[(1,2,2,2 - tetrachloro)-ethyl]-formamide and trans - 2 - methyl - 3 - ethyl-piperazine. The yield was 15% of theory.

Example 20

Using a procedure analogous to that described in Example 1, N,N'-bis-[(1 - formamido - 2,2,2 - trichloro)-ethyl]-cis - 2,3 - dimethyl-piperazine, decomposition point 173° C., was prepared from N-[(1,2,2,2 - tetrachloro)-ethyl]-formamide and cis - 2,3 - dimethyl-piperazine. The yield was 36% of theory.

Example 21

Using a procedure analogous to that described in Example 1, N,N'-bis-[(1 - formamido - 2,2,2 - trichloro)-ethyl]-2-phenyl-piperazine, decomposition point 192° C., of the formula

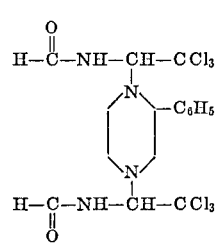

was prepared from N-[(1,2,2,2 - tetrachloro)ethyl]-formamide and 2-phenyl-piperazine. The yield was 16% of theory.

Example 22

Using a procedure analogous to that described in Example 1, N,N'-bis-[(1 - formamido - 2,2,2 - trichloro)-ethyl] - 2 - ethyl-piperazine, decomposition point 164–166° C., of the formula

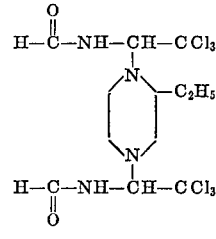

was prepared from N-[(1,2,2,2 - tetrachloro)-ethyl]-formamide and 2-ethyl-piperazine. The yield was 40% of theory.

Example 23

Using a procedure analogous to that described in Example 1, N,N'-bis-[(1-formamido-2,2,2-trichloro)-ethyl]-

2,3,5-trimethyl-piperazine, decomposition point 168° C., of the formula

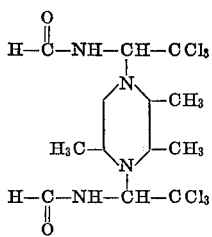

was prepared from N-[(1,2,2,2-tetrachloro)-ethyl]-formamide and a stereoisomeric mixture of 2,3,5-trimethyl-piperazine. The yield was 12% of theory.

Example 24

Using a procedure analogous to that described in Example 1, N,N'-bis[(1-formamido - 2,2,2 - trichloro)-ethyl]-2-n-propyl-piperazine, decomposition point 174° C., of the formula

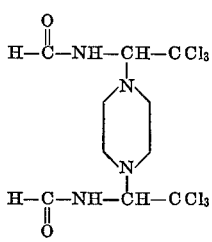

was prepared from N-[(1,2,2,2-tetrachloro)-ethyl]-formamide and 2-n-propyl-piperazine. The yield was 20% of theory.

Example 25

Using a procedure analogous to that described in Example 1, N,N'-bis-[(1-formamido - 2,2,2 - trichloro)-ethyl]-2,6-dimethyl-piperazine, decomposition point 171–172° C., of the formula

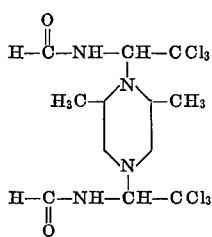

was prepared from N-[(1,2,2,2-tetrachloro)-ethyl]-formamide and 2,6-dimethyl-piperazine. The yield was 11% of theory.

Example 26

N,N'-bis-[(1 - formamido - 2,2,2 - trichloro)ethyl]-piperazine.—A mixture consisting of 2.1 gm. (0.025 mol) of piperazine, 5.1 gm. (0.05 mol) of triethylamine, 6.8 gm. (0.05 mol) of [(1-formamido - 2,2,2 - trichloro)-ethoxy]-benzene and 50 cc. of absolute tetrahydrofuran was allowed to stand for 14 hours at room temperature, and thereafter was refluxed for two hours. Subsequently, the reaction solution was filtered, the filtrate was evaporated in vacuo, and the viscous brown residue, which had an odor of phenol, was digested with 15 cc. of methanol. After several hours of standing, about 10% of theory of N,N' - bis - [1 - formamido-2,2,2-trichloro)-ethyl]-piperazine had crystallized out.

The starting compound, [(1-formamido-2,2,2-trichloro)-ethoxy]-benzene, M.P. 93–94° C., was obtained with a yield of 83% of theory from N-[(1,2,2,2-tetrachloro)-ethyl]-formamide and phenol in the presence of triethylamine.

Example 27

N,N'-bis-[(1 - formamido - 2,2,2 - trichloro)-ethyl]-piperazine.—1.2 gm. (0.014 mol) of piperazine and 7.1 gm. (0.028 mol) of [1-formamido-1-(methylsulfonyl)-2,2,2-trichloro]-ethane were dissolved in 50 cc. of absolute tetrahydrofuran, 2.9 gm. (0.028 mol) of triethylamine were added to the solution, and the mixture was allowed to stand for several hours at room temperature. Thereafter, the reaction solution was diluted with water, and the precipitate formed thereby was collected by vacuum filtration and washed first with water and then with methanol. 96% of theory of N,N'-bis-[(1-formamido-2,2,2-trichloro)-ethyl]-piperazine were obtained.

The starting compound, [1-formamido-1-(methylsulfonyl)-2,2,2-trichloro]-ethane, M.P. 132–133° C., was prepared in the following manner: N-[(1,2,2,2-tetrachloro)-ethyl]-formamide was first reacted with methylmercaptan in the presence of triethylamine, yielding 82% of theory of (1-formamido-1-methylmercapto - 2,2,2 - trichloro)-ethane, M.P. 122–123° C., which was subsequently oxidized with hydrogen peroxide in acetic acid at 20° C. the yield was 66% of theory.

Example 28

Preparation of N,N'-bis-[(1-formamido - 2,2,2 - trichloro)-ethyl]-ethylenediamine by method A.—A mixture consisting of 2.4 gm. (0.04 mol) of ethylene-diamine, 8.3 gm. (0.08 mol +3%) of triethylamine and 50 cc. of dry tetrahydrofuran was added dropwise over a period of one hour to a solution of 16.9 gm. (0.08 mol) of N-[(1,2,2,2-tetrachloro)-ethyl]-formamide in 80 cc. of dry tetrahydrofuran, accompanied by stirring. Thereafter, the reaction mixture was stirred at room temperature for one hour more, the precipitated triethylamine hydrochloride was separated by vacuum filtration, and the filtrate was evaporated in vacuo at 40–50° C. The oily residue crystallized upon being digested with ether, yielding 14.5 gm. (88% of theory) of N,N'-bis-[(1 - formamido-2,2,2-trichloro)-ethyl]-ethylenediamine, M.P. 138–141° C. (decomp.), of the formula

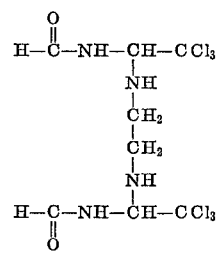

After recrystallization from isopropanol the decomposition point of the reaction product rose to 141–142° C.

Example 29

Using the procedure analogous to that described in Example 28, N,N'-bis-[(1-acetamido - 2,2,2 - trichloro)-ethyl]-ethylenediamine, M.P. 139–142° C. (decomp.), of the formula

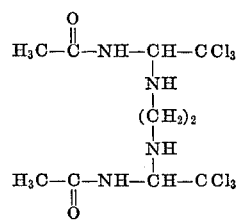

was prepared from N-[(1,2,2,2-tetrachloro)-ethyl]-acetamide and ethylenediamine. The yield was 76% of theory.

Example 30

Using a procedure analogous to that described in Example 28, N,N'-bis-[(1-propionamido - 2,2,2 - trichloro)- ethyl]-ethylenediamine, M.P. 154–155° C. (decomp.), of the formula

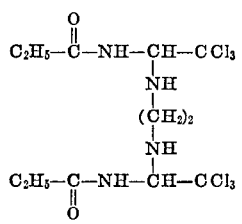

was prepared from N-[(1,2,2,2-tetrachloro)-ethyl]-propionamide and ethylenediamine. The yield was 72% of theory.

Example 31

Using a procedure analogous to that described in Example 28, N,N'-bis-[(1-fluoroacetamido-2,2,2-trichloro)-ethyl]-ethylenediamine, M.P. 105–109° C. (decomp.), of the formula

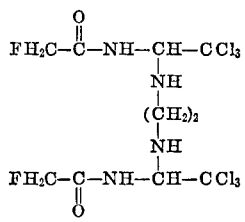

was prepared from N-[(1,2,2,2-tetrachloro)-ethyl]-fluoroacetamide and ethylene diamine. The yield was 53% of theory.

Example 32

Using a procedure analogous to that described in Example 28, N,N'-bis[(1-fluoroacetamido-2,2,2-trichloro)ethyl]-1,3-propylenediamine, M.P. 112–114° C. (decomp.), of the formula

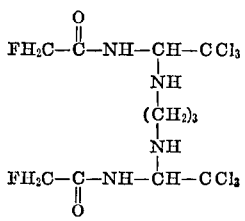

was prepared from N-[(1,2,2,2-tetrachloro)-ethyl]-fluoroacetamide and 1,3-propylenediamine. The yield was 42% of theory.

Example 33

Using a procedure analogous to that described in Example 28, N,N' - bis - [(1 - formamido - 2,2,2-trichloro)-ethyl] - 1,4 - butylenediamine, M.P. 154–157° C. (decomp.), of the formula

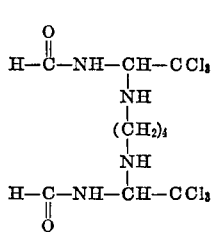

was prepared from N-[(1,2,2,2-tetrachloro)-ethyl]-formamide and 1,4-butylenediamine. The yield was 90% of theory.

Example 34

Using a procedure analogous to that described in Example 28, N,N' - bis - [(1 - formamido - 2,2,2 - trichloro)-ethyl] - 1,5 - pentamethylenediamine, M.P. 113–116° C. (decomp.), of the formula

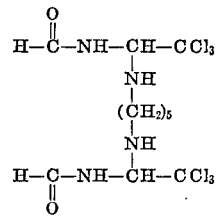

was prepared from N - [(1,2,2,2 - tetrachloro) - etyhl]-formamide and 1,5-pentamethylenediamine. The yield was 65% of theory.

Example 35

Using a procedure analogous to that described in Example 28, N,N' - bis - [(1 - formamido-2,2,2-trichloro)-ethyl] - 1,5 - hexamethylenediamine, M.P. 110–115° C. (decomp.), of the formula

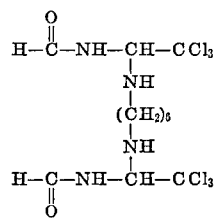

was prepared from N - [(1,2,2,2 - tetrachloro) - ethyl]-formamide and 1,6-hexamethylenediamine. The yield was 72% of theory.

Example 36

Using a procedure analogous to that described in Example 28, N,N' - bis - [(1 - formamido - 2,2,2 - trichloro)-ethyl] - 1,7 - heptamethylenediamine, a viscous oil of the formula

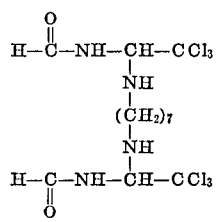

was prepared from N - [(1,2,2,2 - tetrachloro) - ethyl]-formamide and 1,7-heptamethylenediamine. The yield was quantitative.

Example 37

Using a procedure analogous to that described in Example 28, N,N' - bis - [(1 - formamido - 2,2,2 - trichloro)-ethyl] - 1,10 - decamethylenediamine, a non-distillable oil, of the formula

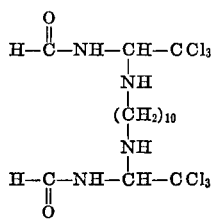

was prepared from N-[(1,2,2,2-tetrachloro)-ethyl]-formamide and 1,10-decamethylenediamine. The yield was quantitative.

2 gm. of the oily product were dissolved in chloroform, and the solution was admixed with ethereal hydrochloric acid. The crystalline precipitate formed thereby was collected by vacuum filtration, washed with ether and gently dried. 2.5 gm. of the dihydrochloride of N,N'-bis-

[(1 - formamido - 2,2,2 - trichloro) - ethyl] - 1,10 - decamethylenediamine (as the solvate with 1 mol of chloroform), M.P. 152–154° C. (decomp.), were obtained.

Example 38

Using a procedure analogous to that described in Example 28, N,N'-bis-methyl-N,N'-bis[(1-formamido-2,2,2-trichloro)-ethyl]-ethylenediamine, M.P. 160° C. (decomp.), (turned brown beginning at 110° C.), of the formula

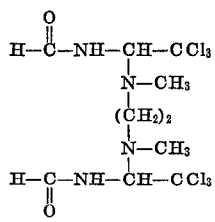

was prepared from N-[(1,2,2,2-tetrachloro)-ethyl]-formamide and N,N'-bis-methyl-ethylenediamine. The yield was 15% of theory.

Example 39

Using a procedure analogous to that described in Example 28, N,N'-bis-phenyl-N,N'-bis-[(1-formamido-2,2,2-trichloro)-ethyl]-ethylenediamine, M.P. 168–170° C. (decomp.), of the formula

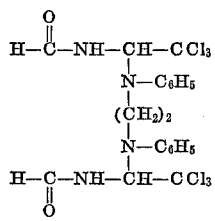

was prepared from N-[(1,2,2,2-tetrachloro)-ethyl]-formamide and 1,2-dianilino-ethane. The yield was 74% of theory.

Example 40

Using a procedure analogous to that described in Example 28, N,N'-bis-($\beta$-cyano-ethyl)-N,N'-bis-[(1-formamido-2,2,2-trichloro) - ethyl] - ethylenediamine, M.P. 190° C. (decomp.) of the formula

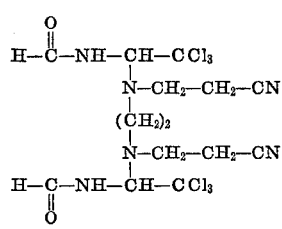

was prepared from N-[(1,2,2,2-tetrachloro)-ethyl]-formamide and N,N'-bis($\beta$-cyanoethyl)-ethylenediamine. The yield was 60% of theory.

Example 41

Using a procedure analogous to that described in Example 28, N-($\beta$-cyano-ethyl)-N,N'-bis-[(1-formamido-2,2,2-trichloro)-ethyl] - ethylenediamine, an amorphous substance, of the formula

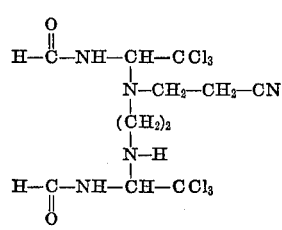

was prepared from N-[(1,2,2,2-tetrachloro)-ethyl]-formamide and N-($\beta$-cyano-ethyl)-ethylenediamine. The yield was 70% of theory.

The amorphous raw product was purified by careful extraction with ether, and the ether-insoluble residue was dried in vacuo at 50° C.

Example 42

Using a procedure analogous to that described in Example 28, N,N' - bis - phenyl - N,N'-bis[(1-pivalylamino-2,2,2-trichloro)-ethyl]-ethylenediamine, M.P. 124–126° C. (decomp.), of the formula

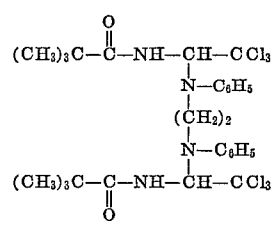

was prepared from N-[(1,2,2,2-tetrachloro)-ethyl]-pivalylamine and 1,2-dianilino-ethane. The yield was 55% of theory.

Example 43

Using a procedure analogous to that described in Example 28, N,N'-bis-phenyl-N,N'-bis-[(1 - trichloroacetamido-2,2,2-trichloro)-ethyl]-ethylenediamine, M.P. 176–180° C. (decomp.), of the formula

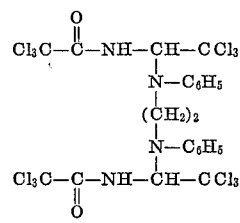

was prepared from N-[(1,2,2,2-tetrachloro)-ethyl]-trichloroacetamide and 1,2-dianilino-ethane. The yield was 33% of theory.

Example 44

Using a procedure analogous to that described in Example 28, N,N'-bis-($\beta$-cyano-ethyl)-N,N'-bis-[(1-formamido-2,2,2-trichloro)-ethyl]-1,3-propylenediamine, and amorphous substance, of the formula

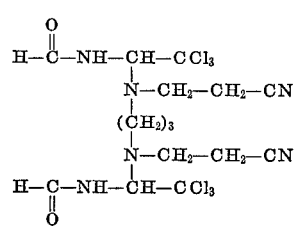

was prepared from N-[(1,2,2,2-tetrachloro)-ethyl]-formamide and N,N'-bis-($\beta$-cyanoethyl)-1,3-diamino-propane. The yield was 74% of theory. The raw reaction product was worked up as described in Example 41.

Example 45

Using a procedure analogous to that described in Example 28, N-($\beta$-cyano-ethyl)-N,N'-bis-[(1-formamido- 2,2,2 - trichloro)-ethyl]-1,3-propylenediamine, an amorphous substance, of the formula

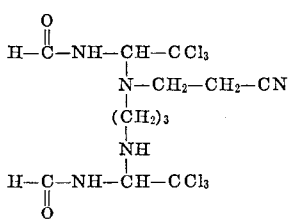

was prepared from N-[(1,2,2,2-tetrachloro)-ethyl]-formamide and N-(β-cyanoethyl)-1,3-diamino-propane. The yield was 70% of theory. The raw reaction product was worked up as described in Example 41.

Example 46

Using a procedure analogous to that described in Example 28, N-n-decyl-N,N'-bis-[(1-formamido - 2,2,2 - trichloro)-ethyl]-ethylenediamine, M.P. 40–45° C. (decomp.), of the formula

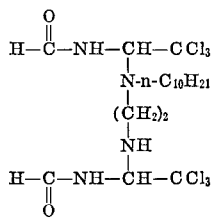

was prepared from N-[(1,2,2,2-tetrachloro)-ethyl]-formamide and N-n-decyl-ethylenediamine. The yield was 88% of theory.

Example 47

Using a procedure analogous to that described in Example 28, N,N'-bis-[(1-chloroacetamido-2,2,2-trichloro)-ethyl]-ethylenediamine, an amorphous substance, of the formula

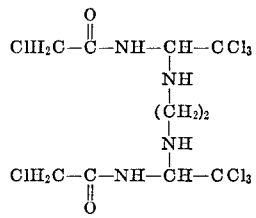

was prepared from N-[(1,2,2,2-tetrachloro)-ethyl]-chloroacetamide and ethylenediamine. The yield was 90% of theory. The viscous raw product was purified by multiple extraction with warm petroleum ether and drying of the extraction residue in vacuo at 50° C.

Example 48

Using a procedure analogous to that described in Example 28, N,N' - bis[(1 - trichloroacetamido - 2,2,2 - trichloro)-ethyl]-ethylenediamine, an amorphous substance, of the formula

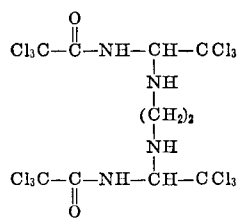

was prepared from N-[(1,2,2,2-tetrachloro)-ethyl]-trichloroacetamide and ethylenediamine. The yield was 72% of theory.

Example 49

N,N'-bis-[(1-acetamido-2,2,2-trichloro) - ethyl] - 1,3-propylenediamine.—While stirring, a solution of 3.7 gm. (0.05 mol) of 1,3-propylenediamine and 10.1 gm. (0.1 mol) of triethylamine in 100 cc. of ether was added dropwise to a solution of 22.5 gm. (0.1 mol) of N-[(1,2,2,2-tetrachloro)-ethyl]-acetamide in 100 cc. of ether. The internal temperature of the reaction mixture rose to the boiling of the ether. The mixed solution was stirred at room temperature for one hour more, and then the colorless precipitate which had formed was collected by vacuum filtration and thoroughly washed with water. The water-insoluble matter was dried, yielding 20.3 gm. (90% of theory) of a colorless crystalline powder, M.P. 149–151° C. (decomp.), which was identified to be N,N'-bis - [(1-acetamido-2,2,2-trichloro) - ethyl] - 1,3-propylenediamine.

Example 50

Using a procedure analogous to that described in Example 49, N,N' - bis-[(1-propionamido-2,2,2-trichloro)-ethyl] - 1,3 - propylenediamine, M.P. 157–159° C. (decomp.), was prepared from N - [(1,2,2,2 - tetrachloro)-ethyl]-propionamide and 1,3-propylenediamine. The yield was 88% of theory. The product was recrystallizable from methylenechloride.

Example 51

Using a procedure analogous to that described in Example 49, N,N' - bis - [(1-pivalylamino-2,2,2-trichloro)-ethyl] - 1,3 - propylenediamine, M.P. 159–161° C. (decomp.), was prepared from N - [(1,2,2,2 - tetrachloro)-ethyl]-pivalylamine and 1,3-propylenediamine. The yield was 85% of theory.

Example 52

N,N' - bis - [(1 - formamido - 2,2,2 - trichloro)-ethyl]-1,2-propylenediamine.—While stirring and cooling with ice, a solution of 2.2 gm. (0.03 mol) of 1,2-propylenediamine and 6.1 gm. (0.06 mol) of triethylamine in 30 cc. of acetone was added dropwise to a solution of 15.2 gm. (0.072 mol) of N-[(1,2,2,2-tetrachloro)-ethyl]-formamide in 70 cc. of acetone. Thereafter, the precipitated triethylamine hydrochloride was separated by vacuum filtration, and the filtrate was evaporated in vacuo. The resinous residue was dissolved in absolute tetrahydrofuran and, while stirring the resulting solution, a slight stoichiometric excess of ethereal hydrochloric acid was added thereto, whereby the hydrochloride of N,N'-bis-[(1 - formamido - 2,2,2 - trichloro)-ethyl]-1,2-propylenediamine separated out as an amorphous-viscous substance. The tetrahydrofuran was decanted, and the hydrochloride was washed with tetrahydrofuran and then suspended in dry tetrahydrofuran. While shaking the resulting suspension, a slight stoichiometric excess of triethylamine dissolved in tetrahydrofuran was added. The triethylamine hydrochloride formed thereby was separated by vacuum filtration, the filtrate was evaporated in vacuo, and the viscous oily residue was thoroughly dried in vacuo at 50° C. 5.5 gm. (44% of theory) of N,N'-bis-[(1-formamido-2,2,2-trichloro)-ethyl]-1,2-propylenediamine of the formula

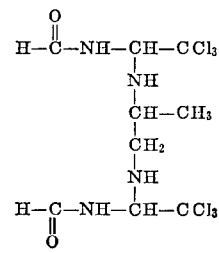

were obtained.

Example 53

Using a procedure analoguos to that described in Example 52, N,N'-bis-[(1 - formamido - 2,2,2 - trichloro)-ethyl]-1,3-propylenediamine, an amorphous substance, was prepared from N-[1,2,2,2-tetrachloro)-ethyl]-formamide and 1,3-propylenediamine. The yield was 64% of theory.

Example 54

Using a procedure analoguous to that described in Example 28, N,N'-bis-[(1 - trimethylacetamido - 2,2,2 - trichloro)-ethyl]-ethylenediamine, M.P. 170–174° C. (decomp.), was prepared from N - [(1,2,2,2 - tetrachloro)-ethyl]-trimethylacetamide and ethylenediamine. The yield was 64% of theory.

Example 55

Using a procedure analogous to that described in Example 28, N,N'-bis-[(1 - trifluoroacetamido - 2,2,2-trichloro)-ethyl]-ethylenediamine, M.P. 125–128° C. (decomp.), was prepared from N-[(1,2,2,2 - tetrachloro)-ethyl]-trifluoroacetamide and ethylenediamine. The yield was 74% of theory.

Example 56

Using a procedure analogous to that described in Example 28, N,N'-bis-[(1 - formamido - 2,2,2-trichloro)-ethyl]-2,2-dimethyl-ethylenediamine, an amorphous substance, of the formula

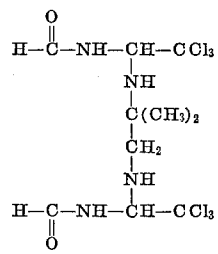

was prepared from N-[(1,2,2,2-tetrachloro)-ethyl]-formamide and 1,2-diamino-1,1-dimethyl-ethane. The yield was 76% of theory.

Example 57

Using a procedure analogous to that described in Example 28, N,N'-bis-benzyl-N,N'-bis-[(1-formamido-2,2,2-trichloro)-ethyl]-ethylenediamine, an amorphous substance, M.P. about 50° C., of the formula

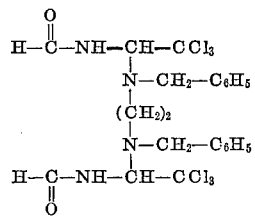

was prepared from N-[(1,2,2,2-tetrachloro)-ethyl]-formamide and N,N'-bis-benzyl-ethylenediamine. The yield was 90% of theory.

Example 58

Using a procedure analogous to that described in Example 28, N,N'-bis-benzyl-N,N'-bis-[(1-formamido-2,2,2-trichloro)-ethyl] - 1,3-propylenediamine, an amorphous substance, M.P. about 60° C., was prepared from N-[(1,2,2,2 - tetrachloro)-ethyl]-formamide and N,N'-bis-benzyl - 1,3-propylenediamine. The yield was 92% of theory.

Example 59

Using a procedure analogous to that described in Example 28, N-methyl-N,N'-bis-[(1-formamido - 2,2,2-trichloro)ethyl]-ethylenediamine, a syrupy substance, was prepared from N-[(1,2,2,2-tetrachloro)-ethyl]-formamide and N-methyl-ethylenediamine. The yield was 51% of theory.

Example 60

Using a procedure analogous to that described in Example 28, N-benzyl-N,N'-bis-[(1 - formamido-2,2,2-trichloro)ethyl]-1,3-propylenediamine, an amorphous substance, was prepared from N-[(1,2,2,2 - tetrachloro)-ethyl]-formamide and N-benzyl - 1,3-propylenediamine. The yield was 90% of theory.

Example 61

Using a procedure analogous to that described in Example 28, N-n-cetyl-N,N'-bis-[(1 - formamido-2,2,2-trichloro)-ethyl]-ethylenediamine, a syrupy substance, of the formula

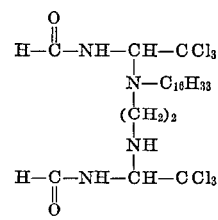

was prepared from N-[(1,2,2,2-tetrachloro)-ethyl]-formamide and N-n-cetyl-ethylenediamine. The yield was 78% of theory.

Example 62

Using a procedure analogous to that described in Example 28, N-n-octyl-N,N'-bis-[(1 - formamido-2,2,2-trichloro)-ethyl]-ethylenediamine, a wax-like substance, was prepared from N-[(1,2,2,2-tetrachloro)-ethyl]-formamide and N-n-octyl-ethylenediamine. The yield was 39% of theory.

Example 63

Using a procedure analogous to that described in Example 28, N-benzyl-N,N'-bis-[(1 - formamido-2,2,2-trichloro)-ethyl]-ethylenediamine, an amorphous substance, was prepared from N-[(1,2,2,2-tetrachloro)-ethyl]-formamide and N-benzylethylenediamine. The yield was 92% of theory.

Example 64

Using a procedure analogous to that described in Example 28, N,N'-bis-(p-chloro-phenyl)-N,N'-bis-[(1-formamido-2,2,2 - trichloro)-ethyl]-methylenediamine, M.P. 174–178° C. (decomp.), of the formula

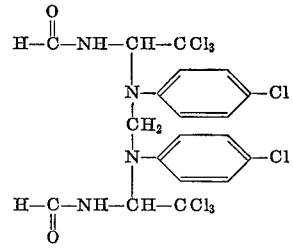

was prepared from N-[(1,2,2,2-tetrachloro)-ethyl]-formamide and bis-(p-chloro-anilino)-methane. The yield was 15% of theory.

Example 65

Using a procedure analogous to that described in Example 28, N,N'-bis-(3,4-dichloro-phenyl)-N,N'-bis-[(1-formamido - 2,2,2 - trichloro)-ethyl]-methylenediamine, M.P. 198–202° C. (decomp.), was prepared from N-[(1,2,2,2-tetrachloro)-ethyl]-formamide and bis-(3,4-dichloro-phenyl)-methane. The yield was 21% of theory.

Example 66

Using a procedure analogous to that described in Example 28, N,N'-bis-phenyl-N,N'-bis-[(1-formamido-2,2,2-trichloro)-ethyl]-methylenediamine, M.P. 102–104° C. (decomp.), was prepared from N-[(1,2,2,2-tetrachloro)-ethyl]-formamide and bis-anilinomethane. The yield was 20% of theory.

Example 67

Using a procedure analogous to that described in Example 28, N,N'-bis-phenyl - N,N' - bis[(1-trimethylacetamido - 2,2,2 - trichloro)-ethyl]-methylenediamine, M.P. 126–129° C. (decomp.), was prepared from N-[(1,2,2,2-tetrachloro)-ethyl] - trimethylacetamide and bis-anilinomethane. The yield was 33% of theory.

Example 68

Using a procedure analogous to that described in Example 28, N-(p-chloro-benzyl)-N,N'-bis-[(1-formamido-2,2,2-trichloro)-ethyl]-ethylenediamine, and amorphous substance, was prepared from N-[(1,2,2,2-tetrachloro)-ethyl]-formamide and N - (p - chloro-benzyl)-ethylenediamine. The yield was 89% of theory.

Example 69

Using a procedure analogous to that described in Example 28, N-(2-chloro-benzyl)-N,N'-bis-[(1-formamido-2,2,2-trichloro) - ethyl] - ethylenediamine, an amorphous substance, was prepared from N-[(1,2,2,2-tetrachloro) ethyl]-formamide and N - (2-chloro-benzyl)-ethylenediamine. The yield was 70% of theory.

Example 70

Using a procedure analogous to that described in Example 28, N-(3,4-dichloro-benzyl) - N,N' - bis-[(1-formamido-2,2,2-trichloro)-ethyl]-ethylenediamine, an amorphous substance, was prepared from N-[(1,2,2,2-tetrachloro)-ethyl]-formamide and N-(3,4-dichloro-benzyl)-ethylenediamine. The yield was 75% of theory.

Example 71

Using a procedure analogous to that described in Example 28, N-(2,4-dichloro-benzyl) - N,N' - bis-[(1-formamido-2,2,2-trichloro)-ethyl]-ethylenediamine, an amorphous substance, was prepared from N-[(1,2,2,2-tetrachloro)-ethyl]-formamide and N-(2,4-dichloro-benzyl)-ethylenediamine. The yield was 94% of theory.

Example 72

Using a procedure analogous to that described in Example 28, N-allyl-N,N'-bis-[(1-formamido-2,2,2-trichloro)-ethyl]-ethylenediamine, an amorphous substance, of the formula

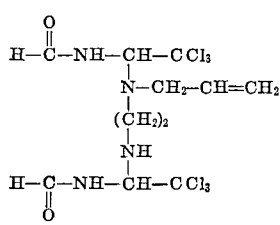

was prepared from N-[(1,2,2,2-tetrachloro)-ethyl]-formamide and N-allyl-ethylenediamine. The yield was 20% of theory.

Example 73

Preparation of N,N'-bis-[(1-formamido-2,2,2-trichloro)ethyl]-methylenediamine by method B.—While stirring, a solution of 10.55 gm. (0.05 mol) of N-[(1,2,2,2-tetrachloro)-ethyl]-formamide in 20 cc. of tetrahydrofuran was added dropwise to 150 cc. of tetrahydrofuran saturated with gaseous ammonia. The resulting mixture was stirred for 30 minutes at room temperature and then filtered. The filtrate was evaporated in vacuo, and the residue was treated with ether, whereby a small amount of insoluble di-[(1-formamido - 2,2,2 - trichloro)-ethyl]-amine, M.P. 180–185° C. (decomp.), remained behind. The ethereal solution was filtered, the filtrate was evaporated, and the residue was treated with gasoline, yielding 95% of theory of (1-formamido-1-amino-2,2,2-trichloro)-ethane, M.P. 71–73° C.

5 gm. of this compound were dissolved in 150 cc. of water, 3 cc. of a 35% formalin solution were added thereto, and the resulting mixture was allowed to stand for two weeks at room temperature. Thereafter, the crystalline precipitate formed during that time was collected by vacuum filtration and recrystallized from acetonitrile. 69% of theory of N,N'-bis[(1-formamido-2,2,2-trichloro)-ethyl]-methylenediamine, M.P. 145–147° C., were obtained.

Example 74

N,N'-bis-[(1 - formamido - 2,2,2 - trichloro)-ethyl]-ethylenediamine by method A.—A solution of 0.6 gm. (0.01 mol) of ethylenediamine, 6.5 gm. (0.02 mol) of (1 - formamido - 1 - cyclohexylsulfonyl-2,2,2-trichloro)-ethane and 2 gm. (0.02 mol) of triethylamine in 50 cc. of absolute tetrahydrofuran was allowed to stand at room temperature for five hours. Thereafter, the precipitate formed during that time was separated by filtration, the filtrate was evaporated in vacuo, and the resinous residue was treated with methylene chloride. 47% of theory of N,N'-bis[(1 - formamido - 2,2,2 - trichloro)-ethyl]-ethylenediamine was obtained.

The starting compound (1-formamido-1-cyclohexylsulfonyl - 2,2,2 - trichloro)-ethane, was prepared from N-[(1,2,2,2-tetrachloro)-ethyl]-formamide and cyclohexylmercaptan by way of the thioether (yield: 86% of theory; M.P. 65–67° C.), and subsequent oxidation with 30% hydrogen peroxide (yield: 63% of theory; M.P. 120–123°C.

Example 75

Using a procedure analogous to that described in Example 74, N,N'-bis-[(1-formamido - 2,2,2 - trichloro)-ethyl]-1,4-butylenediamine was prepared from 1,4-diaminobutane, (1 - formamido-1-methylsulfonyl-2,2,2-trichloro)-ethane and triethylamine. The yield was 75% of theory (after purification of the amorphous raw product with ether).

The compounds according to the present invention, that is, those embraced by Formula I above, have useful properties. More particularly, the compounds of the invention are highly effective fungicides with very low phytotoxicity; thus they may be effectively used for prophylactic as well as curative treatment of plants against phytopathogenic fungi. For instance, complete prevention against infestation is achieved in the case of a number of true mildew fungi, such as *Erysiphe graminis* and *Erysiphe polygoni*. Furthermore, the compounds according to the invention are effective in combatting rust fungi, such as *Uromyces fabrae* and *Puccinia arenariae*; causes of wilting diseases, such as *Verticillium alboatrum*; causes of plant scabs, such as *Venturia inaequalis*; mold fungi, such as *Aspergillus niger*; and various other harmful fungi, such as Fusaria and Ophiobuli.

Particularly noteworthy is the good systemic effect of the novel compounds.

The compounds according to the present invention are also useful as anthelmintics and enhance the germination of seeds, such as pea and cotton seeds.

The compounds of the Formula I also exhibit very low toxicity toward warm-blooded animals.

Among the subclass of compounds of the Formula I wherein Q is —NR$_6$—R$_5$—NR$_7$—, those wherein one or both of R$_6$ and R$_7$ are hydrogen are particularly effective fungicides.

For prophylactic or curative treatment of plants against fungus infestation, the compounds according to the present invention are incorporated as active ingredients into customary fungicidal compositions, i.e. compositions consisting essentially of a liquid or comminuted solid inert carrier and an effective fungicidal amount of the active ingredient, such as solutions, emulsion concentrates, suspendable or wettable powders, dusting powders, granulates and sprays. The active ingredient content of these compositions is about 0.5 to 85% by weight, preferably 0.5 to 50% by weight.

For instance, an emulsion concentrate contains about 0.5 to 20% by weight, preferably 5 to 10% by weight, of a compound of the Formula I. Suitable solvents for the preparation of emulsion concentrates comprising a compound of the invention as an active ingredient are, for example, mixtures of dimethylformamide or N-methylpyrrolidone with alcohols or glycols. Suitable emulsifiers and wetting agents which may be used for the preparation of such emulsion concentrates are non-ionic compounds, such as nonylphenol polyglycol ether, or mixtures of non-ionic and ionic, preferably anionic, compounds as well as ampholytes. The emulsifier content of the emulsion concentrate is about 0.5 to 45% by weight, preferably 5 to 25% by weight.

The active ingredient content of a wettable powder is about 0.5 to 80% by weight, preferably 5 to 25% by weight. Suitable emulsifiers and wetting agents which may be used for the preparation of wettable powders are non-ionic or ionic compounds of the type described in the preceding paragraph; the total amount of emulsifier and wetting agent in such wettable powders is about 0.5 to 25% by weight, preferably to 25% by weight. Suitable powdery inert carriers are, for example, bentonite, kaolin and colloidal silicic acid.

The fungicidal compositions comprising a compound of the present invention as an active ingredient are, if necessary, diluted with water to an active ingredient concentration of 0.5 to 0.00001% prior to their use for combatting fungi. Dusting powders may have a higher active ingredient concentration. The upper limit for the application concentration is predicated upon the relatively low phytotoxicity.

The following examples illustrate a few fungicidal compositions comprising a compound of the instant invention as an active ingredient and represent the best mode contemplated of putting the invention to practical use. The percentages are percent by weight.

Example 76

Dusting powder: Percent
Compound of the Formula I _____ 1
Talcum _____ 98
Methylcellulose _____ 1

The components are admixed with each other, and the mixture is milled until homogeneous.

Example 77

Wettable powder: Percent
Compound of the Formula I _____ 25
Kaolin _____ 55
Colloidal silicic acid _____ 10
Lignin sulfonate (dispersing agent) _____ 9
Sodium tetrapropylene benzene sulfonate (wetting agent) _____ 1

The components are admixed, the mixture is milled until homogeneous, and prior to use the powder is suspended in an amount of water such that the active ingredient concentration in the aqueous suspension is from 0.00001 to 0.5% by weight.

Example 78

Emulsion concentrate: Percent
Compound of the Formula I _____ 10
Sodium tetrapropylene benzene sulfonate (anionic emulsifier) _____ 5
Nonylphenol polyglycol ether (non-ionic emulsifier) _____ 20
Propyleneglycol _____ 32.5
N-methylpyrrolidone _____ 32.5

The components are uniformly admixed with each other, and prior to use the resulting concentrate is diluted with water to the desired active ingredient content between 0.00001 and 0.5% by weight.

Example 79

Aerosol spray: Percent
Compound of the Formula I _____ 0.05
Sesame oil _____ 0.10
N-methylpyrrolidone _____ 10.00
Propellant gas _____ 89.85

The components are admixed in customary fashion, and the mixture is charged into aerosol containers provided with a spray valve.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A compound of the formula

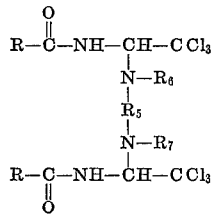

wherein

R is hydrogen, lower alkyl or halo-lower alkyl,
$R_5$ is alkylene of 1 to 10 carbon atoms, and
$R_6$ and $R_7$ are each hydrogen, alkyl of 1 to 16 carbon atoms or allyl.

2. A compound of the formula

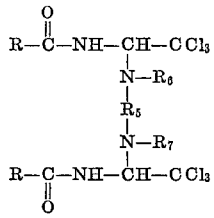

wherein

R is hydrogen, alkyl of 1 to 4 carbon atoms, chloromethyl, dichloromethyl, trichloromethyl, fluoromethyl or trifluoromethyl,
$R_5$ is alkylene of 1 to 10 carbon atoms,
$R_6$ is hydrogen, alkyl of 1 to 6 carbon atoms or allyl, and
$R_7$ is hydrogen or methyl.

3. A compound according to claim 2, which is N,N'-bis - [(1 - formamido - 2,2,2 - trichloro) - ethyl] - ethylenediamine.

4. A compound according to claim 2, which is N,N'-bis - [(1 - formamido - 2,2,2 - trichloro) - ethyl] - 1,2-propylenediamine.

5. A compound according to claim 2, which is N,N'-bis-[(1 - formamido - 2,2,2 - trichloro) - ethyl] - 1,3 - propylenediamine.

6. A compound according to claim 2, which is N-methyl - N,N' - bis - [(1 - formamido - 2,2,2 - trichloro)-ethyl]-ethylenediamine.

References Cited

UNITED STATES PATENTS 3,253,030   5/1966   Buc _____ 260—561
3,298,955   1/1967   Strang _____ 252—51.5
3,520,927   7/1970   Malz et al. _____ 260—562

LEWIS GOTTS, Primary Examiner

E. G. LOVE, Assistant Examiner

U.S. CL. X.R.

71—77, 92, 118; 424—250, 320; 260—268, 465.4, 562

UNITED STATES PATENT OFFICE
CERTIFICATE OF CORRECTION

Patent No. 3,595,916          Dated July 27, 1971

Inventor(s) WALTER OST, KLAUS THOMAS, DIETRICH JERCHEL and KARL-RICHARD APPEL

It is certified that error appears in the above-identified patent and that said Letters Patent are hereby corrected as shown below:

Column 1, lines 25 to 31, the formula should read

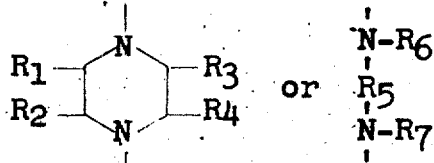

Column 4, line 69, "C,27.22" should read --C, 27.12--.
Column 5, line 36, "N,N" should read --N,N'--.
Column 7, line 51, the formula should read

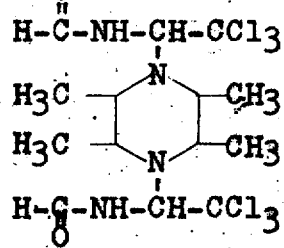

Column 8, line 16, in the formula "$C_2H_4$" should read --$C_2H_5$--.

Column 9, line 26, that portion of the formula reading

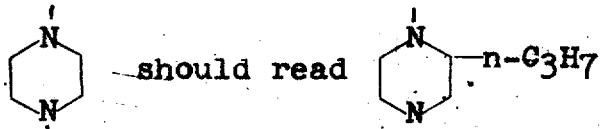

Column 12, line 19, "1,5" should read --1,6--.
Column 21, line 22, after "preferably" insert --2--.

Signed and sealed this 21st day of March 1972.

(SEAL)
Attest:

EDWARD M. FLETCHER, JR.        ROBERT GOTTSCHALK
Attesting Officer              Commissioner of Patents